April 25, 1950     W. W. HAMILL     2,505,397
PIPE JOINT

Filed June 16, 1947     4 Sheets-Sheet 1

Inventor
William Wilson Hamill
by William Strauss
Attorney

April 25, 1950   W. W. HAMILL   2,505,397
PIPE JOINT

Filed June 16, 1947   4 Sheets-Sheet 2

Inventor
William Wilson Hamill
by William A. Davis
Attorney

April 25, 1950 W. W. HAMILL 2,505,397
PIPE JOINT

Filed June 16, 1947 4 Sheets-Sheet 4

Inventor
William Wilson Hamill
by William H Davis
Attorney

Patented Apr. 25, 1950

2,505,397

UNITED STATES PATENT OFFICE 2,505,397

PIPE JOINT

William Wilson Hamill, Little Aston, England

Application June 16, 1947, Serial No. 754,927
In Great Britain January 17, 1945

Section 1, Public Law 690, August 8, 1946
Patent expires January 17, 1965

3 Claims. (Cl. 285—27)

This invention relates to apparatus for regulating and controlling temperature or rate of flow of liquids, of the kind including a body, a control member adapted to coact with ports or orifices in the body, and a temperature-responsive element operatively coupled to the said member.

One object of the invention is to provide better facilities for the pipe connections associated with the apparatus; another object is a construction which allows the pipes to be disposed out of sight if desired; another object is to improve the accessibility to the internal working parts; another object is the provision of a compact and neat apparatus; and further objects will appear in a perusal of the following description.

Figure 1:
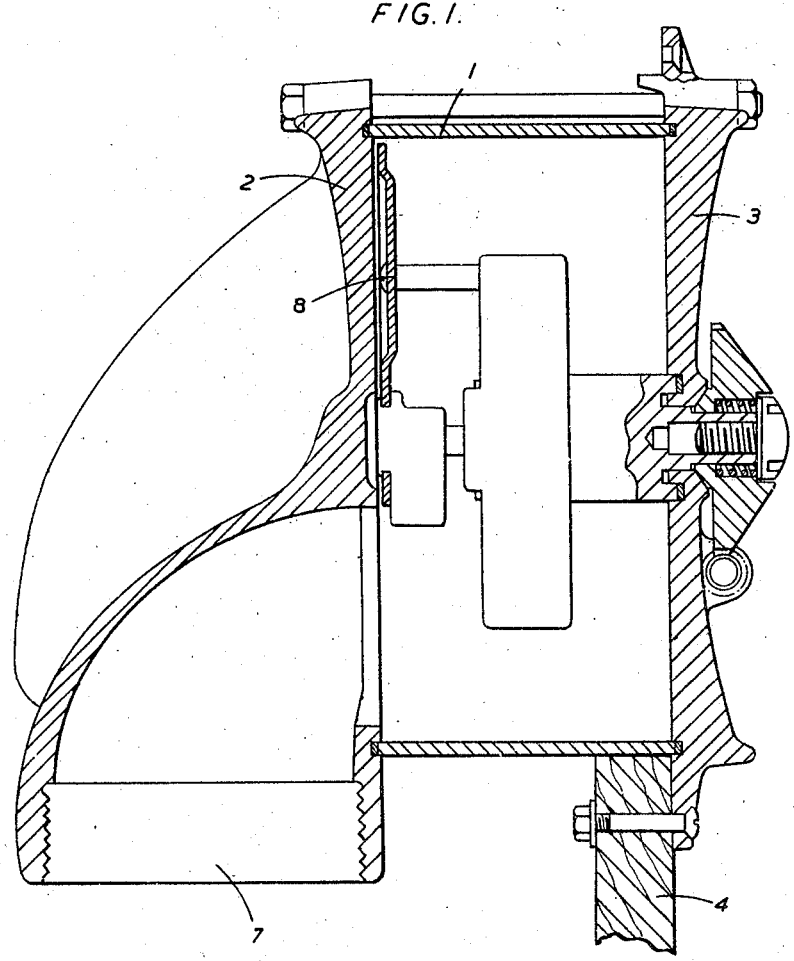
Figure 2:
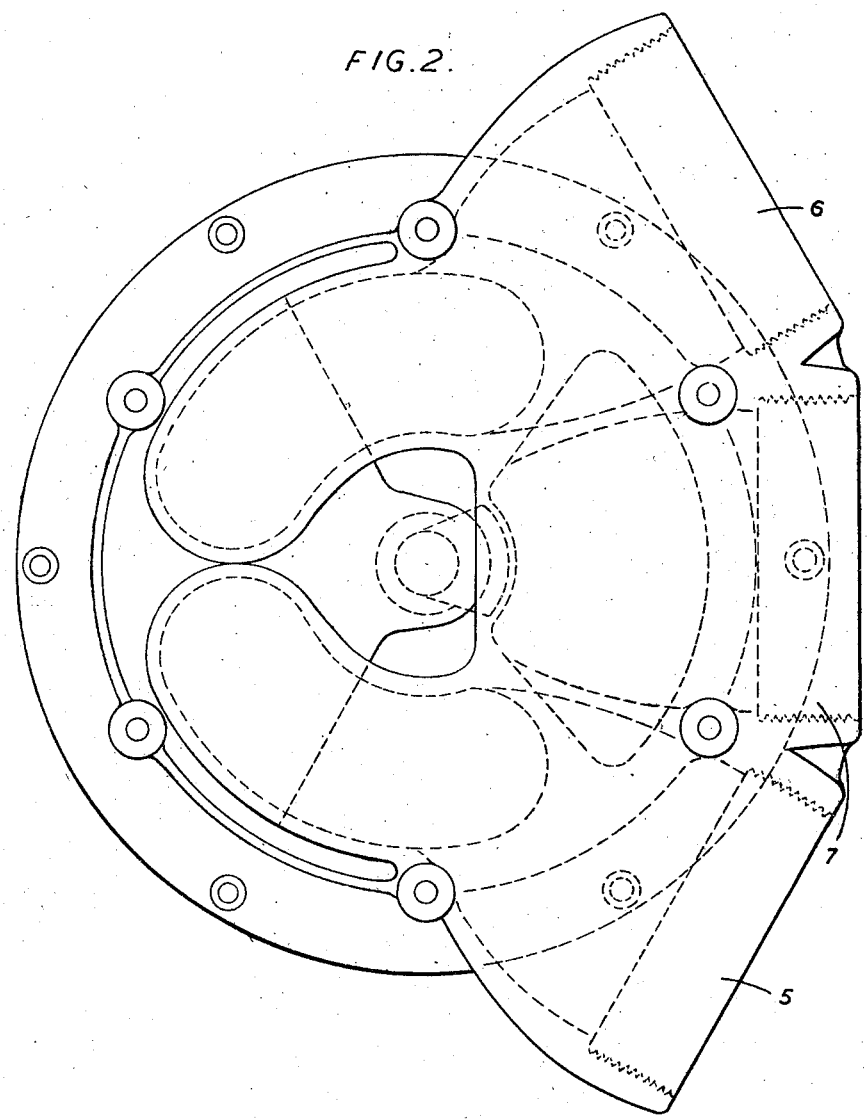
Figure 3:
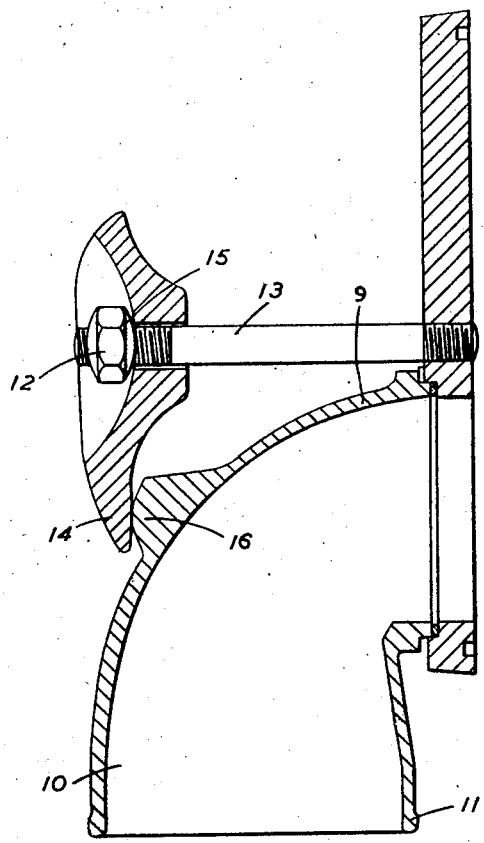
Figure 4:
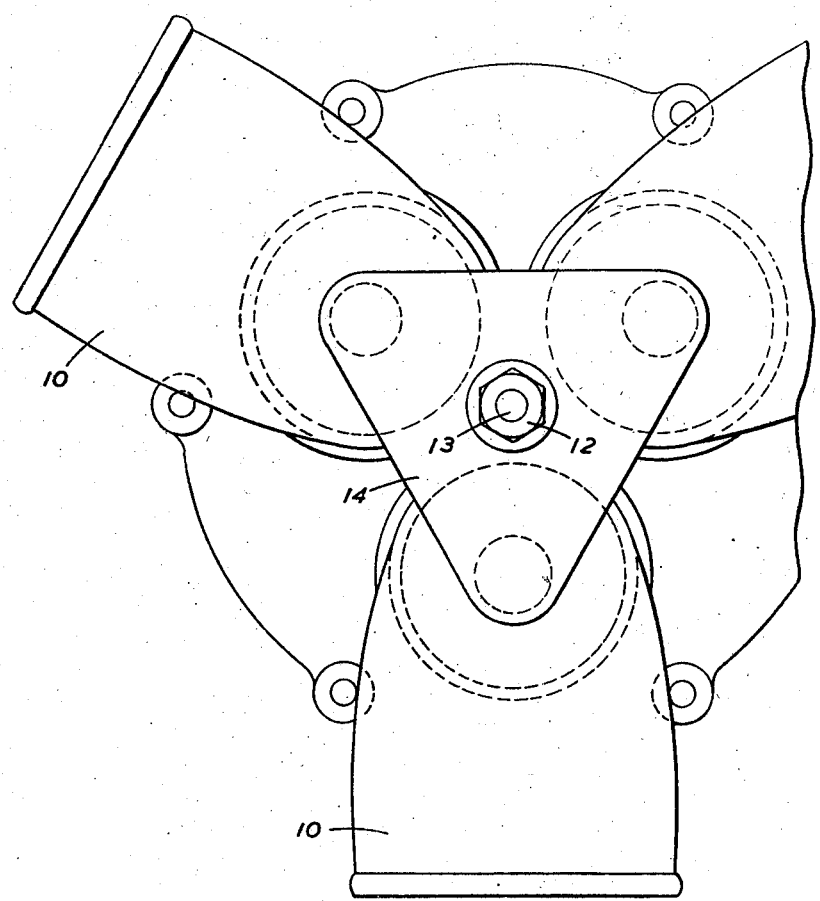

Reference may be had to the accompanying drawings in which Figure 1 is a cross-sectional elevation and Figure 2 an end elevation of one embodiment of the invention having integral elbows for passage of liquid while Figures 3 and 4 illustrate a modification in which the elbows are angularly adjustable.

In one convenient embodiment of the invention, the body is built up with a circular tube 1 which can be fabricated in an inexpensive manner from sheet material or a length of pipe, and two end plates 2, 3 adapted to grip the end faces of the tube by nuts and bolts which pass through peripheral flanges or extensions of the end plates, one 3 of said flanges serving also for securing the apparatus to e. g. a facia board 4 for flush fitting with the tube part passing therethrough.

The other end plate is thus located at the rear of the board 4 or other anchorage and is provided with the desired number of conduits, for example two inlets 5, 6 and a single outlet 7, or two outlets and a single inlet depending on the particular side of functioning of the apparatus, the two inlets being controlled by the oscillatory plate or disc shaped control member 8 so that as the effective area of one is increased, the flow area of the other is diminished.

Where adjustment to suit pipe connections is not called for, the conduits may be continued in elbows or bend configurations cast integrally with the end plate as shown in Figures 1 and 2, but preferably the elbows are made as separate parts as indicated in Figures 3 and 4 with one limb 9 spigotted with a sealing washer into the rear plate 2, and the other limb 10 at right angles provided with a screw thread for engagement by the end of a pipe or an enlargement 11 for hose coupling. Each elbow is thus capable of independent angular adjustment or swivel about the axis of its spigot for fixing or location at any point within a considerable range, prior to being clamped into joint-making contact, which arrangement is of material assistance when installing the instrument.

A separate bolt and nut may be used for clamping each elbow, but a simplification in the number of parts is realisable by means of a single nut and bolt 12, 13 anchored at one end to and at the centre of the rear plate 2, when the elbows are placed at the three corners of a triangle, which is with advantage equilateral. A circular, triangular or three-armed clamping plate 14 is pressed at the same time onto the three elbows by the nut 12 which takes a bearing at the middle zone of the clamping plate and makes the three joints concurrently. A coiled spring may be placed around the bolt to act in opposition to the nut pressure and retrogress the plate as the nut is unscrewed.

To ensure substantially equal distribution of the clamping pressure and to accommodate small errors in alignment, curved or spheroidal surfaces are embodied at the pressure zones 15, 16 of the nut and plate, and of the plate and elbows. One surface of each mating pair is with advantage arranged as a cavity and the other as a projection with the purpose of facilitating relative location and extending the distance through which interengagement is present and through which self-adjustment may take place anterior to application of the joint-making pressure.

In installing the pipework of the improved instrument, the clamping nut is slackened, the pipes connected to the elbows after the latter have been swivelled into locations or directions most convenient for so connecting, and the nut simply tightened to make all three joints.

Having thus described my invention, what I claim is:

1. In a device of the character described, the combination comprising a body having a plurality of orifices, a plurality of elbows each including a limb cooperating with the body and registering with an orifice, reaction means on each elbow for directing a force applied thereto axially of the limb cooperating with the body regardless of the angular position of the elbow, and a clamping plate connected to the body and including a plurality of means each engaging the reaction means of an elbow regardless of the angular position of the elbow.

2. In a device of the character described, the combination comprising a body having a plurality of orifices, a plurality of elbows each including a limb cooperating with the body and registering with an orifice, reaction means on each elbow for directing a force applied thereto axially of the limb cooperating with the body regardless of the angular position of the elbow, a centrally apertured clamping plate including a plurality of means each engaging the reaction means of an elbow regardless of the angular position of the elbow, and means connected to the body and passing through the aperture and engaging the clamping plate.

3. In a device of the character described, the combination comprising a body having a plurality of orifices, a plurality of elbows each including a limb cooperating with the body and registering with an orifice, reaction means on each elbow for directing a force applied thereto axially of the limb cooperating with the body regardless of the angular position of the elbow, a centrally apertured clamping plate including a plurality of means each engaging the reaction means of an elbow regardless of the angular position of the elbow, a spherical concave surface adjacent the aperture on the side of said plate remote from the body, and a bolt threaded in the body and passing freely through the aperture, and a nut on the bolt and having a spherical convex surface for engaging the spherical concave surface.

WM. WILSON HAMILL.

REFERENCES CITED

The following references are of record in the file of this patent:

UNITED STATES PATENTS

| Number | Name | Date |
| --- | --- | --- |
| 661,200 | Wehinger | Nov. 6, 1900 |
| 1,476,719 | Leonard | Dec. 11, 1923 |
| 1,957,276 | Leonard | May 1, 1934 |

FOREIGN PATENTS

| Number | Country | Date |
| --- | --- | --- |
| 5,461 | Great Britain | 1892 |